(12) United States Patent
Kim et al.

(10) Patent No.: US 11,458,819 B2
(45) Date of Patent: Oct. 4, 2022

(54) FLUSH GLASS APPARATUS

(71) Applicants: Hyundai Motor Company, Seoul (KR); Kia Motors Corporation, Seoul (KR); Webasto Korea Holdings Ltd., Ulsan (KR)

(72) Inventors: Jeong Hyeon Kim, Suwon-si (KR); Seong Min Gwak, Yangsan-si (KR); Su Yun Choi, Ulsan (KR)

(73) Assignees: Hyundai Motor Company, Seoul (KR); Kia Motors Corporation, Seoul (KR); Webasto Korea Holdings Ltd., Ulsan (KR)

( * ) Notice: Subject to any disclaimer, the term of this patent is extended or adjusted under 35 U.S.C. 154(b) by 214 days.

(21) Appl. No.: 17/036,282

(22) Filed: Sep. 29, 2020

(65) Prior Publication Data
US 2021/0156183 A1    May 27, 2021

(30) Foreign Application Priority Data

Nov. 22, 2019    (KR) .......................... 10-2019-0151184

(51) Int. Cl.
| | |
|---|---|
| *B60J 1/16* | (2006.01) |
| *E05C 9/04* | (2006.01) |
| *B60J 1/00* | (2006.01) |
| *E05C 9/14* | (2006.01) |
| *B60J 1/20* | (2006.01) |
| *B60J 1/18* | (2006.01) |

(52) U.S. Cl.
CPC ................. *B60J 1/16* (2013.01); *B60J 1/004* (2013.01); *E05C 9/042* (2013.01); *E05C 9/14* (2013.01); *B60J 1/1853* (2013.01); *B60J 1/20* (2013.01); *E05Y 2201/474* (2013.01); *E05Y 2201/682* (2013.01); *E05Y 2900/55* (2013.01)

(58) Field of Classification Search
CPC ... E05C 9/042; E05C 9/14; B60J 1/004; B60J 1/16; B60J 1/1846; B60J 1/1853
USPC .................................... 296/146.16, 201, 155
See application file for complete search history.

(56) References Cited

U.S. PATENT DOCUMENTS

| | | | |
|---|---|---|---|
| 5,996,285 A * | 12/1999 | Guillemet | E05D 15/1047 49/213 |
| 2005/0044798 A1 * | 3/2005 | Daniel | B60J 1/1853 49/413 |

(Continued)

FOREIGN PATENT DOCUMENTS

EP         1916132 A1 *   4/2008  ................ B60J 1/16

*Primary Examiner* — D Glenn Dayoan
*Assistant Examiner* — Wenwei Zhuo
(74) *Attorney, Agent, or Firm* — Slater Matsil, LLP

(57) ABSTRACT

A flush glass apparatus includes an operation glass including a glass portion and a frame, and a locking device including an operation handle installed on the frame, an upper lifting member installed on an upper side of the frame and including an upper cam groove and an upper locking pin, an upper operation shaft having a lower side connected to the operation handle and an upper side entering the upper cam groove and including an upper protrusion, an upper spring, a lower lifting member installed on a lower side of the frame and including a lower cam groove and a lower locking pin protruding to the lower side of the frame, a lower operation shaft having an upper side connected to the operation handle and a lower side entering the lower cam groove and including a lower protrusion, and a lower spring.

19 Claims, 16 Drawing Sheets

(56) References Cited

U.S. PATENT DOCUMENTS

| | | | |
|---|---|---|---|
| 2006/0260205 A1* | 11/2006 | Dufour | B60J 1/1853 49/413 |
| 2011/0289732 A1* | 12/2011 | Schulte | B60J 1/16 16/96 R |
| 2013/0145694 A1* | 6/2013 | Park | B60J 1/16 49/257 |
| 2013/0174488 A1* | 7/2013 | Snider | B60J 1/002 49/70 |
| 2016/0114655 A1* | 4/2016 | Hick | E05D 15/0621 49/127 |
| 2017/0254131 A1* | 9/2017 | Otsubo | B60J 1/16 |
| 2021/0017792 A1* | 1/2021 | Giroux | E05D 15/0686 |

* cited by examiner

FIG. 8A
FIG. 8B
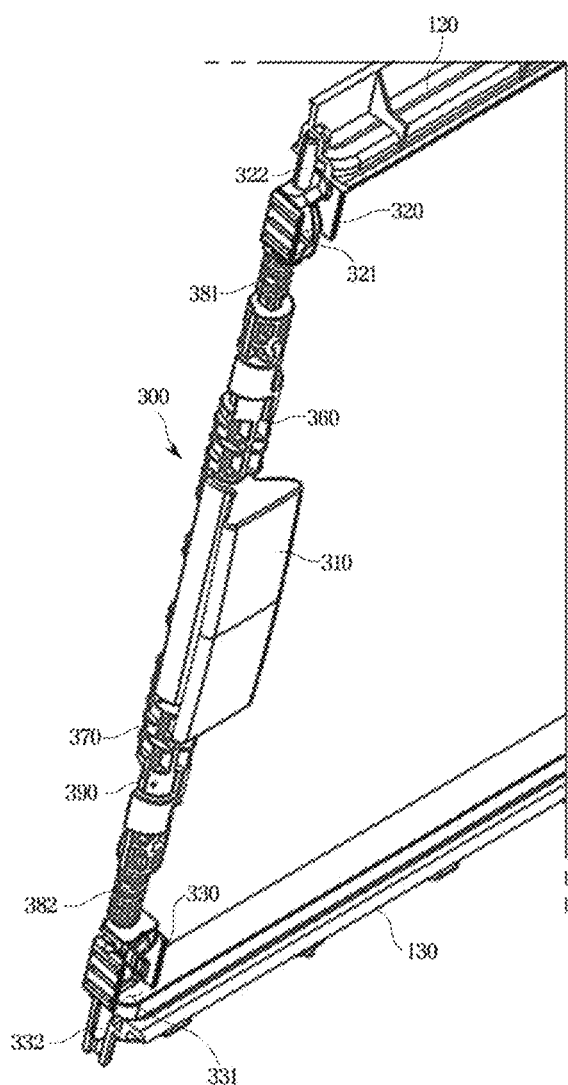
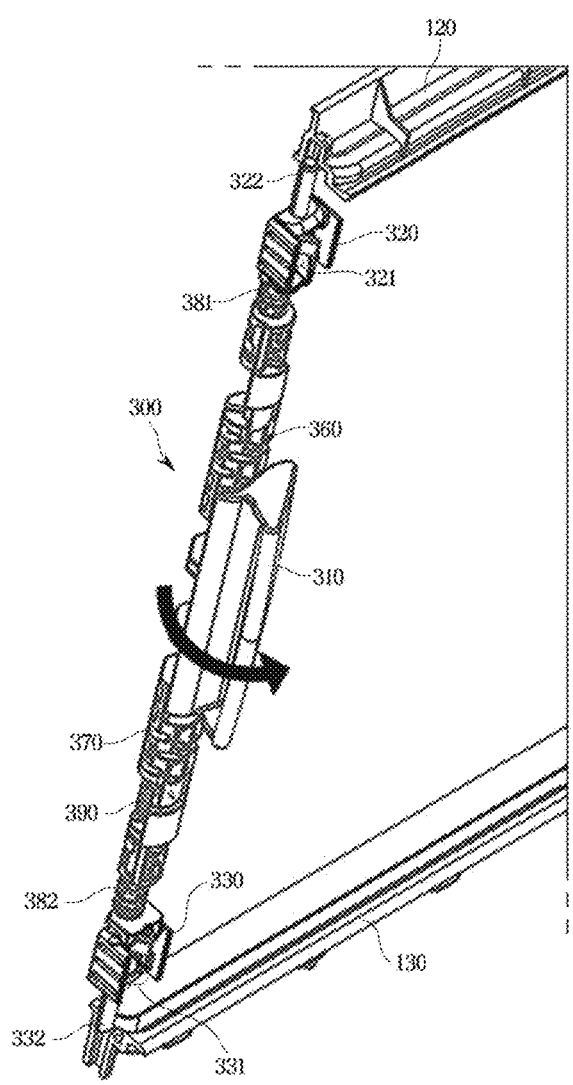

FIG. 9A
FIG. 9B
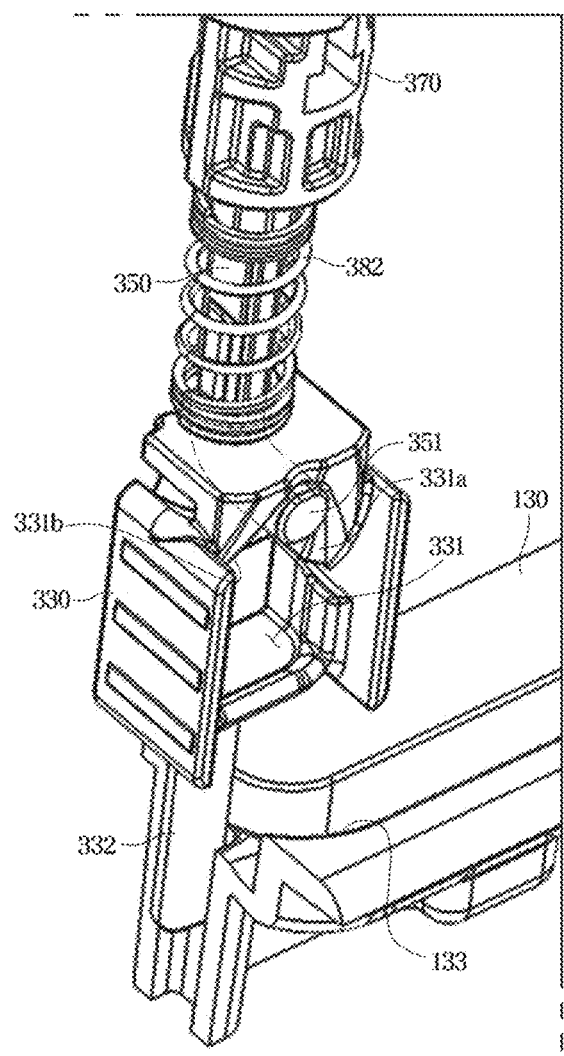
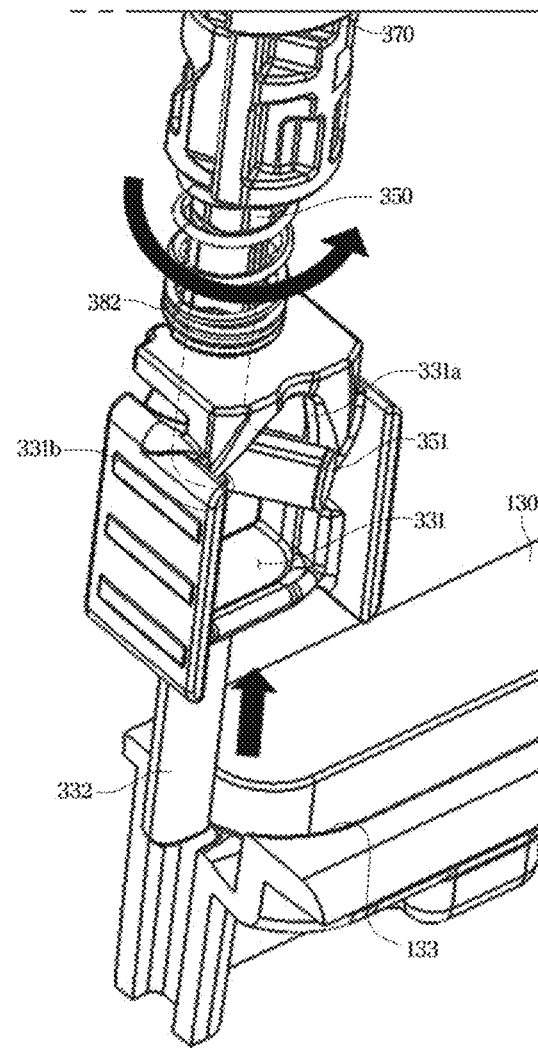

FIG. 10A
FIG. 10B
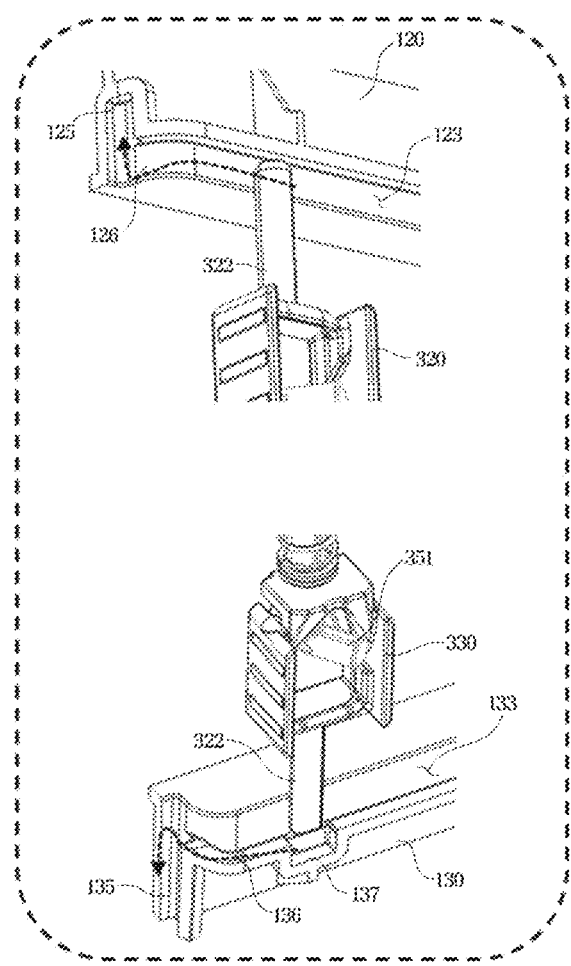
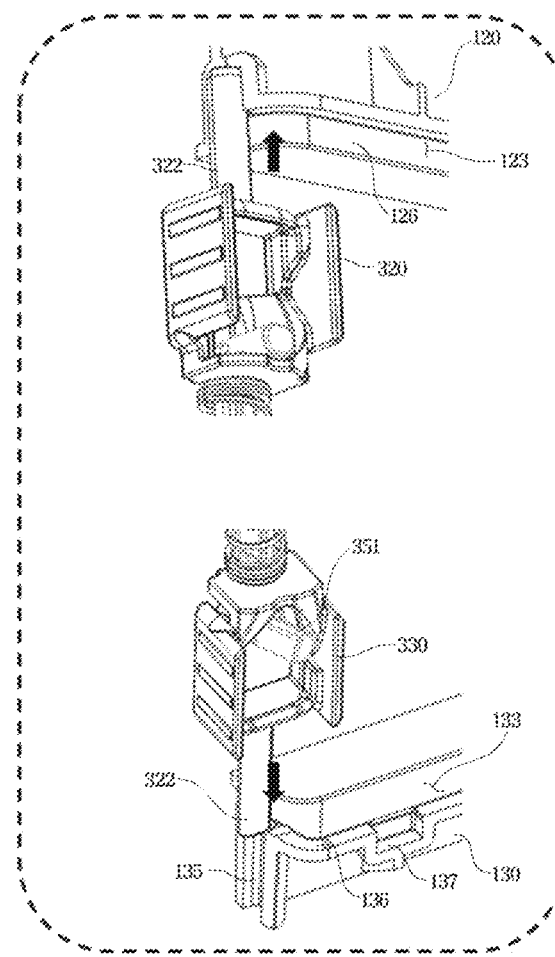

FLUSH GLASS APPARATUS

CROSS-REFERENCE TO RELATED APPLICATIONS

This application claims the benefit of Korean Patent Application No. 10-2019-0151184, filed on Nov. 22, 2019, in the Korean Intellectual Property Office, which application is hereby incorporated herein by reference.

TECHNICAL FIELD

The disclosure relates to a flush glass apparatus.

BACKGROUND

Large passenger vehicles such as RVs (Recreational Vehicles) and SUVs (Sport Utility Vehicles) are equipped with a flush glass apparatus.

The flush glass apparatus includes a fixed glass having an opening, an operation glass moving in a sliding manner to open and close the opening of the fixed glass, and a locking device locking the operation glass in a closed state or releasing the locking to open the operation glass.

The locking device may include locking pins installed on the operation glass to be able to ascend and descend, restoration springs restoring the locking pins in a locking direction, and a plurality of operation handles for moving the locking pins in an unlocking direction.

However, because the flush glass apparatus as above has a structure in which a user moves the plurality of operation handles in the vertical direction to unlock the restoration springs, it is difficult to open and close the operation glass. In addition, because the plurality of operation handles is not restored during the opening of the operation glass, it is difficult to provide a beautiful appearance.

SUMMARY

The disclosure relates to a flush glass apparatus. Particular embodiments relate to a flush glass apparatus capable of easily opening and closing an operation glass and stably binding the operation glass when the operation glass is closed.

It is an aspect of embodiments of the disclosure to provide a flush glass apparatus capable of easily opening and closing an operation glass by an easy operation of a locking device.

It is another aspect of embodiments of the disclosure to provide a flush glass apparatus capable of providing a beautiful appearance by restoring an operation handle in a state in which an operation glass is opened or closed.

Additional aspects of embodiments of the disclosure will be set forth in part in the description which follows and, in part, will be obvious from the description, or may be learned by practice of the disclosure.

In accordance with an embodiment of the disclosure, a flush glass apparatus includes an operation glass including a glass portion and a frame and configured to open and close an opening of a fixed glass by sliding in a lateral direction, and a locking device configured to lock and unlock the operation glass, wherein the locking device includes an operation handle installed on the frame to be rotated left and right and configured to be restored to its original state by a restoration spring, an upper lifting member installed on an upper side of the frame and including an upper cam groove and an upper locking pin protruding above the frame, an upper operation shaft having a lower side connected to the operation handle and an upper side entering the upper cam groove and including an upper protrusion extending radially in the upper cam groove, an upper spring configured to move the upper lifting member by pressing upward, a lower lifting member installed on a lower side of the frame and including a lower cam groove and a lower locking pin protruding to the lower side of the frame, a lower operation shaft having an upper connected to the operation handle and a lower side entering the lower cam groove and including a lower protrusion extending radially in the lower cam groove, and a lower spring configured to move the lower lifting member by pressing downward.

The upper operation shaft may be connected to the operation handle by an upper connection shaft having an upper side penetrating a lower portion of the upper lifting member to enter the upper cam groove and a lower side rotatably supported on the frame.

The lower operation shaft may be connected to the operation handle by a lower connection shaft having a lower side penetrating an upper portion of the lower lifting member to enter the lower cam groove and an upper side rotatably supported on the frame.

The upper cam groove and the lower cam groove may each include a first inclined cam surface configured to come into contact with the upper protrusion or the lower protrusion when the operation handle is rotated in an opening direction and move the upper lifting member or the lower lifting member to an inner side of the frame by a first distance, and a second inclined cam surface configured to come into contact with the upper protrusion or the lower protrusion when the operation handle is rotated in a closing direction and move the upper lifting member or the lower lifting member to an inner side of the frame by a second distance shorter than the first distance.

The first inclined cam surface may have a length and a height in a vertical direction longer than the second inclined cam surface.

The flush glass apparatus may further include an upper rail slidably supporting an upper portion of the frame and having an upper guide groove extending in a lengthwise direction to guide the movement of the upper locking pin, and a lower rail slidably supporting a lower portion of the frame and having a lower guide groove extending in a lengthwise direction to guide the movement of the lower locking pin.

The upper guide groove and the lower guide groove may each include a curved guide portion configured to induce the upper locking pin or the lower locking pin to the outdoor side so that an outer surface of the operation glass forms the same plane as an outer surface of the fixed glass when the operation glass is completely closed, and a locking groove formed deeper upward or downward than the upper guide groove or the lower guide groove so that the upper locking pin or the lower locking pin is caught thereon in a state in which the operation glass is completely closed.

The lower guide groove may include a plurality of intermediate locking grooves formed deeper downward than the lower guide groove at positions spaced apart from each other in a moving direction of the lower locking pin so that the lower locking pin protrudes and is caught thereon in the opening process of the operation glass, and a locking groove formed deeper downward than the lower guide groove so that the lower locking pin protrudes and is caught thereon in a state in which the operation glass is completely opened.

A width of the plurality of intermediate locking grooves may be formed larger than a diameter of the lower locking pin.

BRIEF DESCRIPTION OF THE DRAWINGS

These and/or other aspects of embodiments of the disclosure will become apparent and more readily appreciated from the following description of the embodiments, taken in conjunction with the accompanying drawings of which:

FIGS. 8A and 8B are perspective views of the locking device of the flush glass apparatus according to an embodiment of the disclosure, illustrating a state before operation and a state after operation, respectively;

FIGS. 9A and 9B are perspective views illustrating in detail an operating principle of the locking device of the flush glass apparatus according to an embodiment of the disclosure;

FIGS. 10A and 10B illustrate a curved guide portion and a locking groove provided in an upper guide groove and a lower guide groove of the flush glass apparatus according to an embodiment of the disclosure;

DETAILED DESCRIPTION OF ILLUSTRATIVE EMBODIMENTS

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
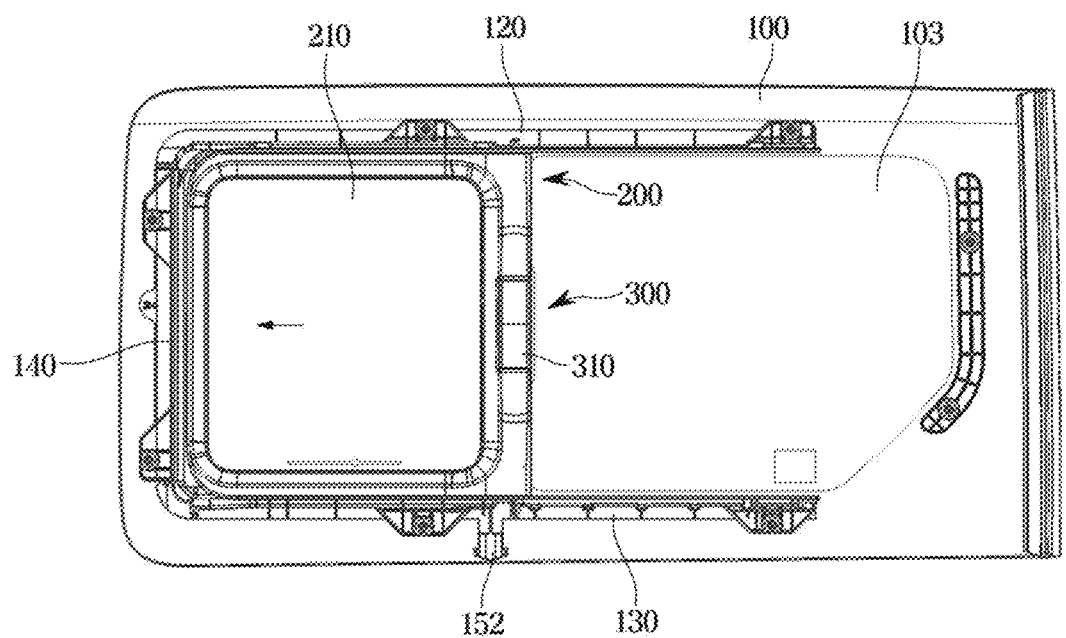
FIG. 1 is a front view of a flush glass apparatus according to an embodiment of the disclosure when an operation glass is closed.
Figure 2:
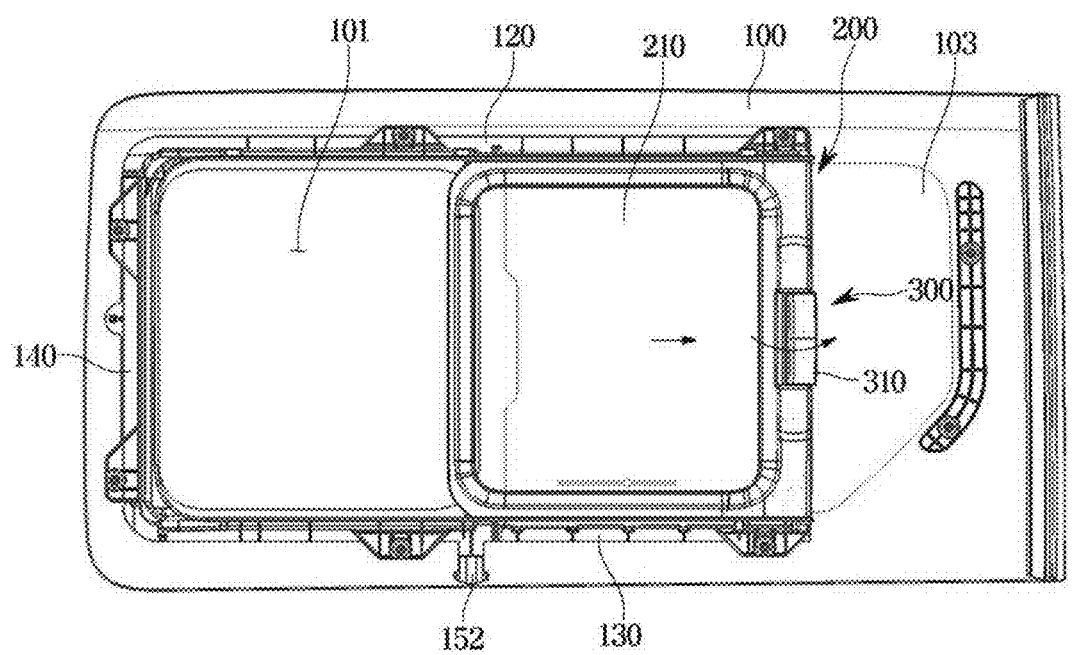
FIG. 2 is a front view of the flush glass apparatus according to an embodiment of the disclosure when the operation glass is opened.

Referring to FIGS. 1 and 2, a flush glass apparatus according to an embodiment of the disclosure includes a fixed glass 100 provided with an opening 101, an operation glass 200 configured to move in a lateral sliding manner to open and close the opening 101 of the fixed glass 100, and a locking device 300 configured to lock the operation glass 200 in a state of being closed or release the locking to open the operation glass 200.

Figure 3:
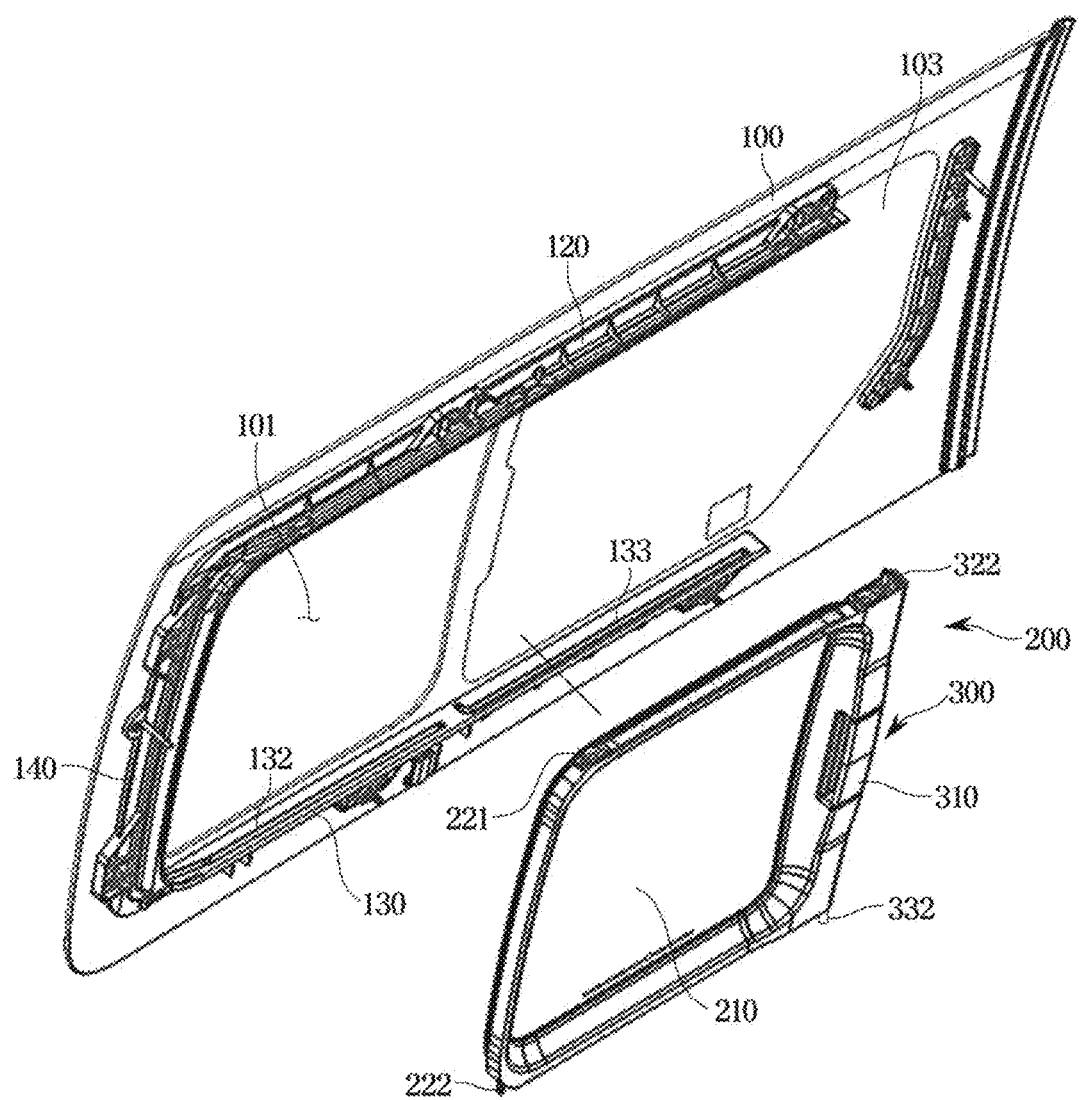
FIG. 3 is a perspective view illustrating a state in which the operation glass of the flush glass apparatus according to an embodiment of the disclosure is separated from a fixed glass.
Figure 4:
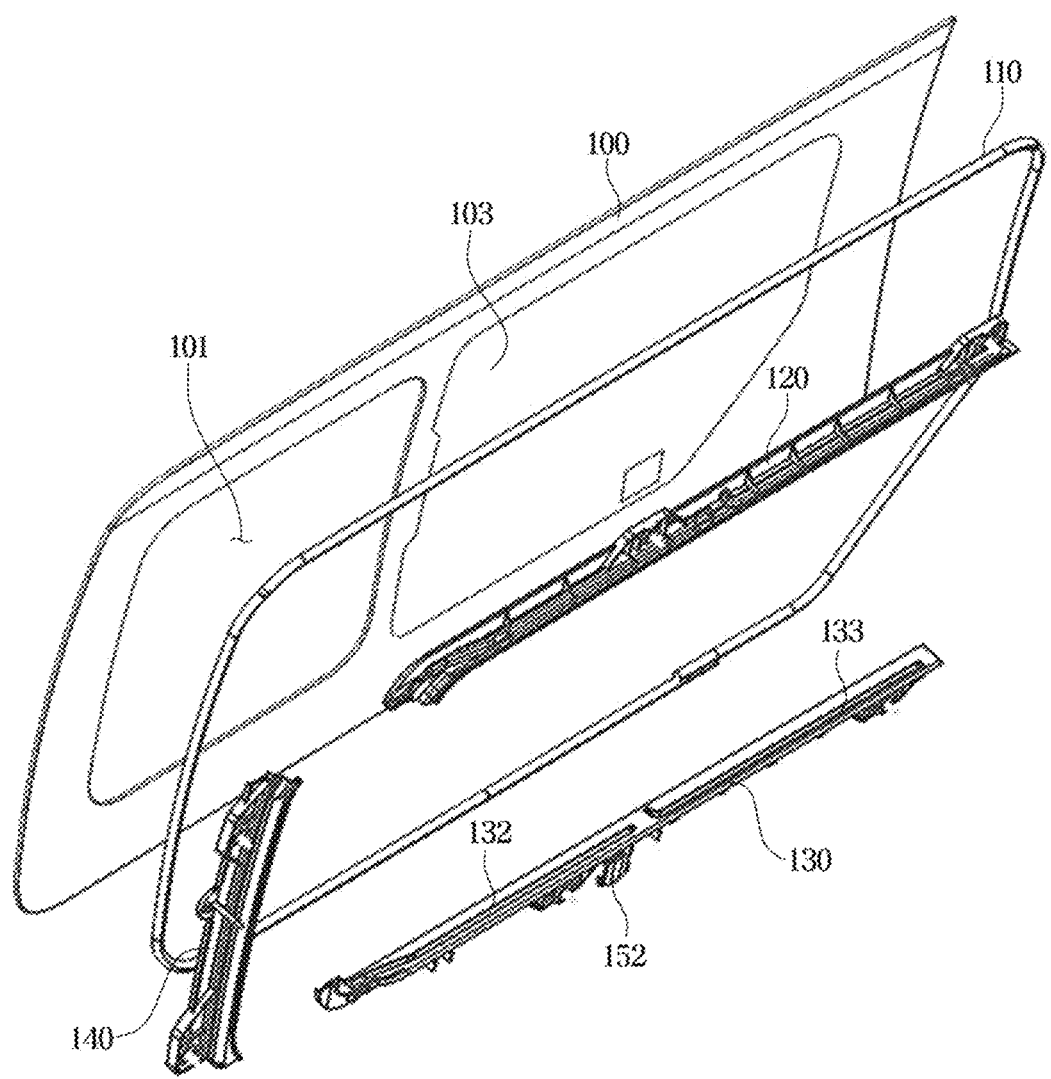
FIG. 4 is an exploded perspective view of parts of the fixed glass side of the flush glass apparatus according to an embodiment of the disclosure.

The fixed glass 100 may be formed in a rectangular panel shape having a long length in a transverse direction, as illustrated in FIGS. 3 and 4. The fixed glass 100 may be mounted in a state in which a rim portion thereof is sealed on a side surface of a vehicle body (not shown). The fixed glass 100 includes a see-through glass portion 103 and the opening 101 that is opened and closed by the operation glass 200.

A sealing member 110, an upper rail 120, a lower rail 130, and a connection rail 140 may be mounted on an inner surface of the fixed glass 100. The sealing member 10 is installed along an inner side of the rim portion of the fixed glass 100 so that the fixed glass 100 may maintain sealing when mounted on the vehicle body. The upper rail 120 guides a lateral sliding of the operation glass 200 while supporting an upper side of the operation glass 200, and the lower rail 130 guides the lateral sliding of the operation glass 200 while supporting a lower side of the operation glass 200. The connection rail 140 connects a front end of the upper rail 120 and a front end of the lower rail 130 at an inner side of the fixed glass 100 and is coupled to a front end of the operation glass 200 when the operation glass 200 is closed, so that the sealing of the opening 101 may be maintained as illustrated in FIG. 1.

Figure 5:
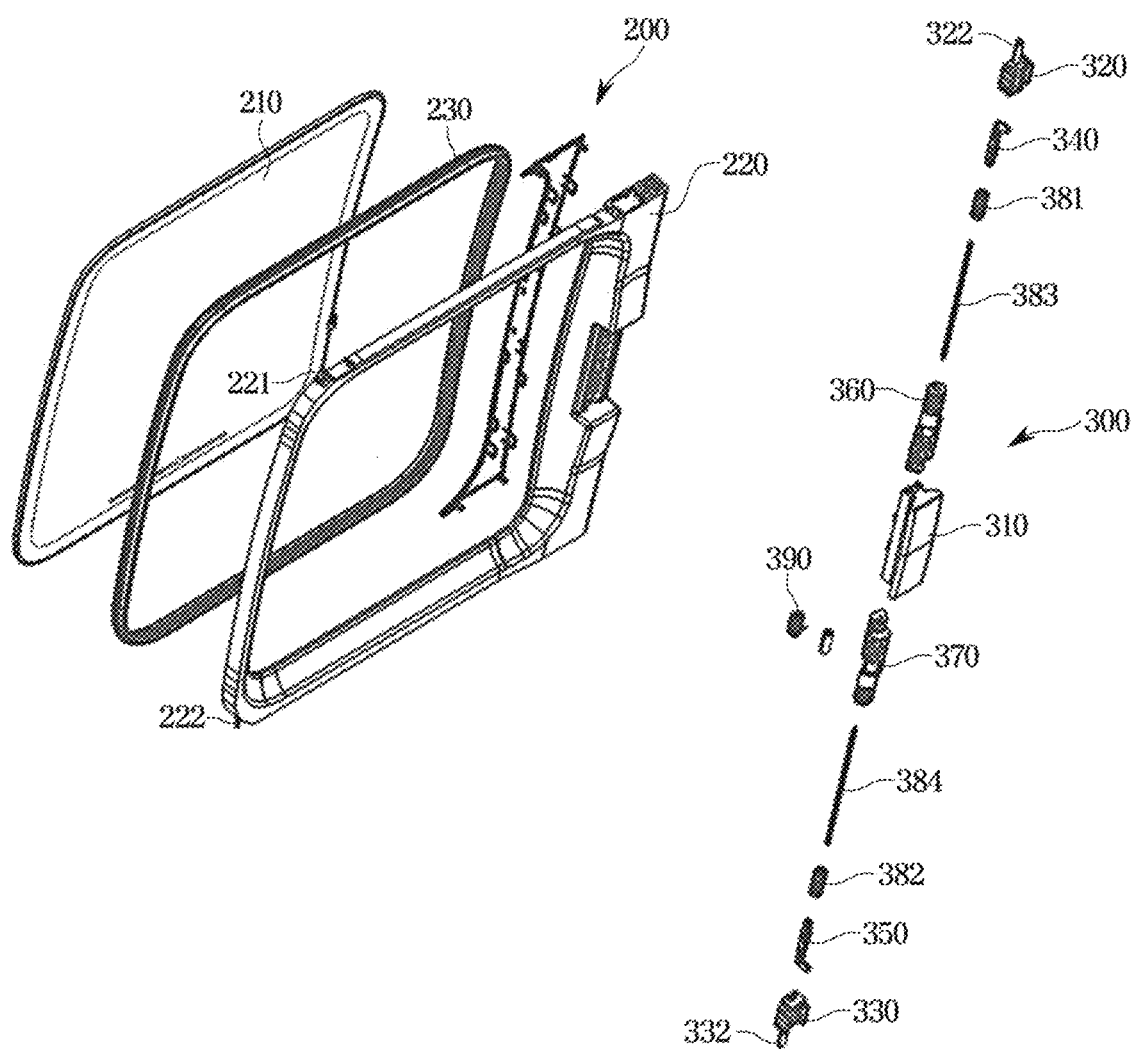
FIG. 5 is an exploded perspective view of the operation glass and a locking device of the flush glass apparatus according to an embodiment of the disclosure.
Figure 7:
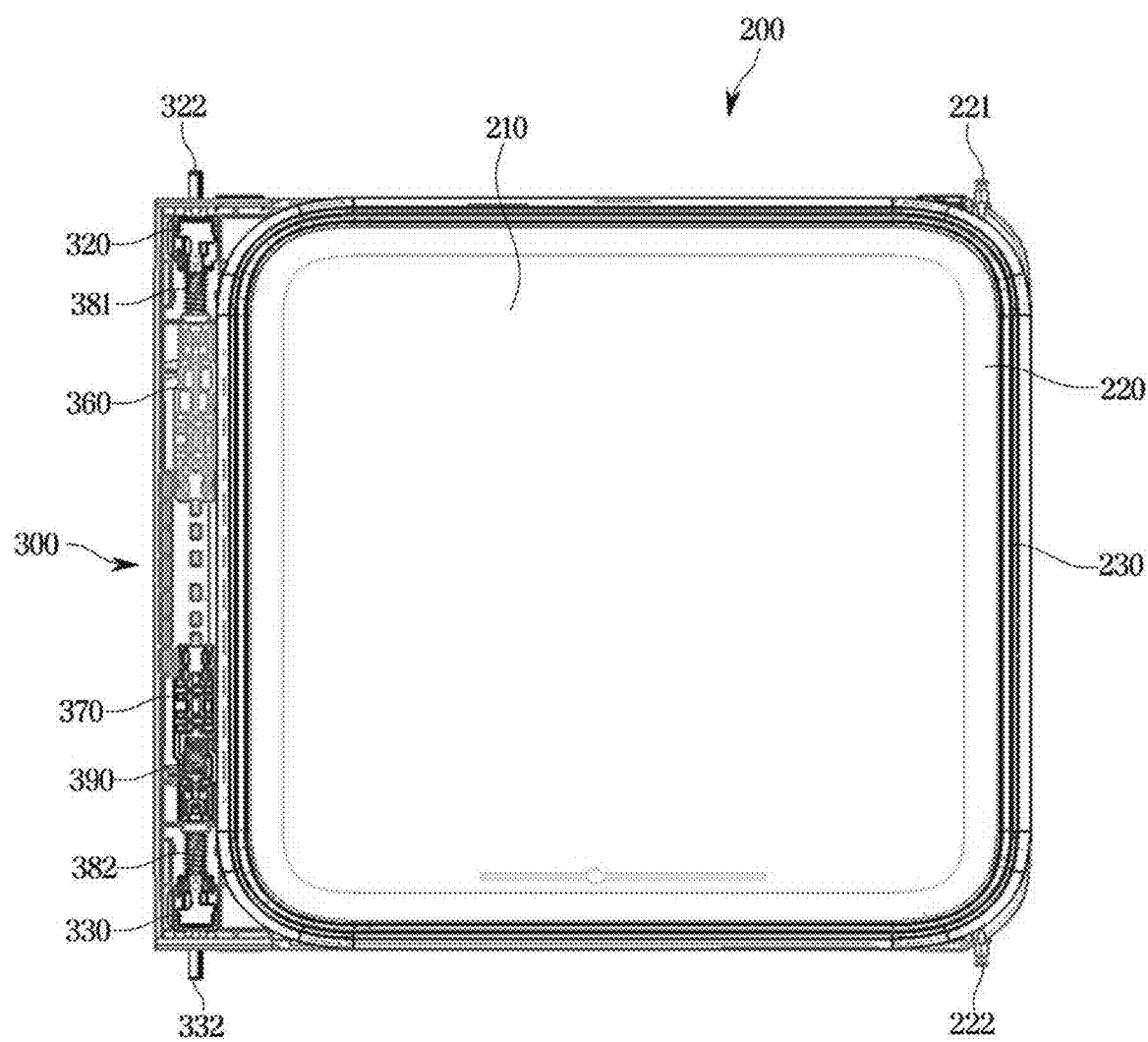
FIG. 7 illustrates the locking device mounted on the operation glass of the flush glass apparatus according to an embodiment of the disclosure.

The operation glass 200 includes a see-through glass portion 210, a frame 220 supporting a rim portion of the glass portion 210, and a sealing member 230 coupled to an inner surface of a rim portion of the frame 220, as illustrated in FIGS. 3, 5, and 7.

The rim portion of the glass portion 210 is attached to the frame 220, and the sealing member 230 is mounted on the frame 220 in a form surrounding an outer side of the glass portion 210. The sealing member 230 seals a gap between the operation glass 200 and the fixed glass 100 while coming into close contact with the inner surface of the fixed glass 100 when the operation glass 200 is closed.

Figure 6:
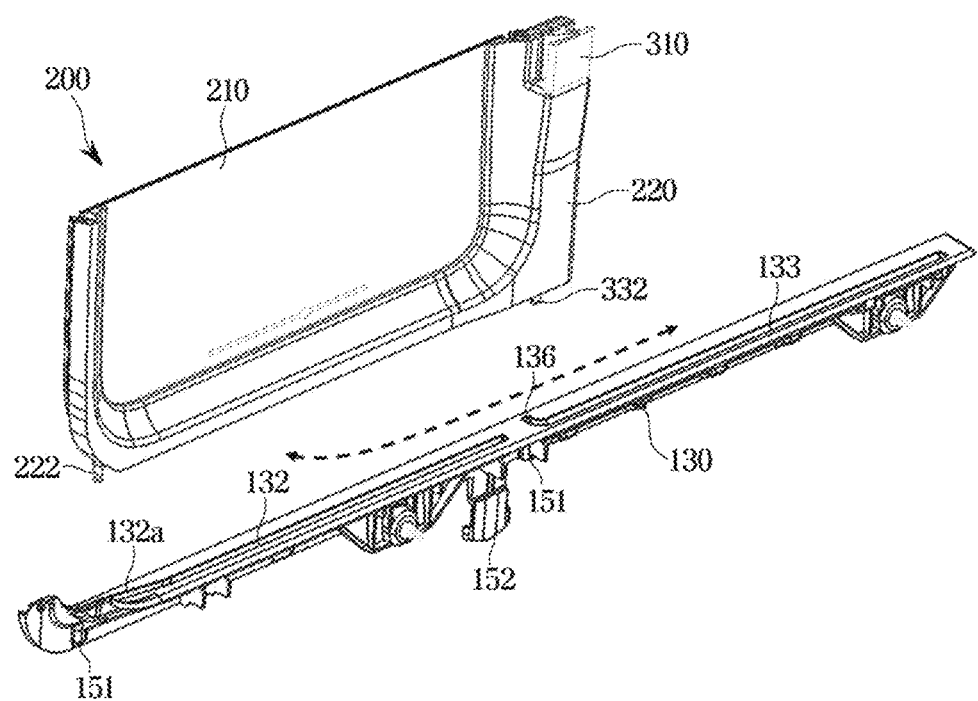
FIG. 6 is a perspective view of the operation glass and a lower rail of the flush glass apparatus according to an embodiment of the disclosure.

Referring to FIGS. 3, 6, and 7, the operation glass 200 includes a front upper locking pin 221 and a rear upper locking pin 322 coupled to the upper rail 120, and a front lower locking pin 222 and a rear lower locking pin 332 coupled to the lower rail 130. The upper rail 120 is provided with a front upper guide groove to which the front upper locking pin 221 is coupled, and a rear upper guide groove to which the rear upper locking pin 322 is coupled. The lower rail 130 is provided with a front lower guide groove 132 to which the front lower locking pin 222 is coupled, and a rear lower guide groove 133 to which the rear lower locking pin 332 is coupled. Although the drawings do not clearly illustrate the front upper guide groove and rear upper guide groove of the upper rail 120, they may be provided similar to the front lower guide groove 132 and the rear lower guide groove 133 of the lower rail 130 illustrated in FIG. 6.

The operation glass 200 may slide in opening and closing directions as the front upper locking pin 221 and the rear upper locking pin 322 are coupled to the front and rear upper guide grooves of the upper rail 120 and the front lower locking pin 222 and the rear lower locking pin 332 are coupled to the front and rear lower guide grooves 132 and 133 of the lower rail 130.

As illustrated in FIGS. 5, 7, and 8, the locking device 300 may include an operation handle 310, an upper lifting member 320, a lower lifting member 330, an upper operation shaft 340, a lower operation shaft 350, an upper connection shaft 360, a lower connection shaft 370, an upper spring 381, a lower spring 382, an upper connection pin 383, a lower connection pin 384, a restoration spring 390.

The operation handle 310 may be installed in a state exposed to an outer side of the frame 220 so that a user may easily operate the operation handle 310, and the remaining parts of the locking device 300 may be accommodated in the frame 220 or installed in an exposed state toward a rear surface of the frame 220.

The operation handle 310 may be installed on a vertical middle portion of the frame 220 to be rotatable left and right. The operation handle 310 may be restored to its original state by the elasticity of the restoration spring 390 installed on the lower connection shaft 370 side when an operation force by the user is released.

The upper lifting member 320 is installed on an upper side of the frame 220 to be able to ascend and descend and may include the upper cam groove 321 and the upper locking pin 322 extending upward to protrude above the frame 220. The upper locking pin 322 may have an axis line coincident with a rotation center line of the operation handle 310.

Like the upper lifting member 320, the lower lifting member 330 is installed on a lower side of the frame 220 to be able to ascend and descend and may include the lower cam groove 331 and the lower locking pin 332 extending downward to protrude below the frame 220. The lower locking pin 332 may also have an axis line coincident with the rotation center line of the operation handle 310.

Figure 11:
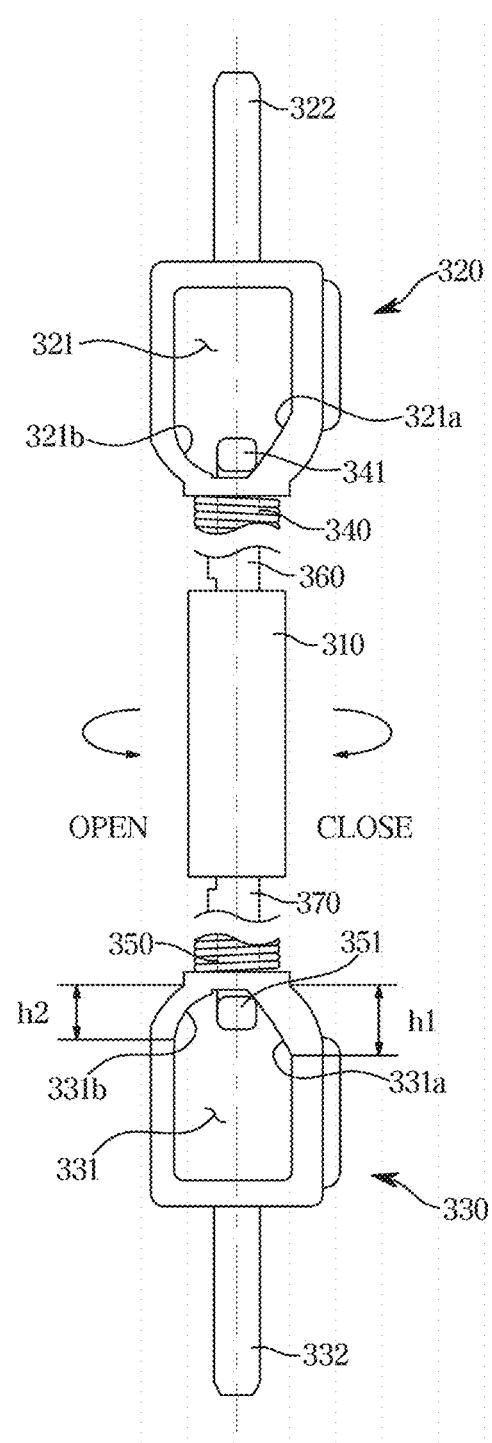
FIGS. 11, 12A, 12B, and 12C illustrate first and second inclined cam surfaces of upper and lower lifting members, and an operating principle thereof in the locking device of the flush glass apparatus according to an embodiment of the disclosure.
Figure 12A:
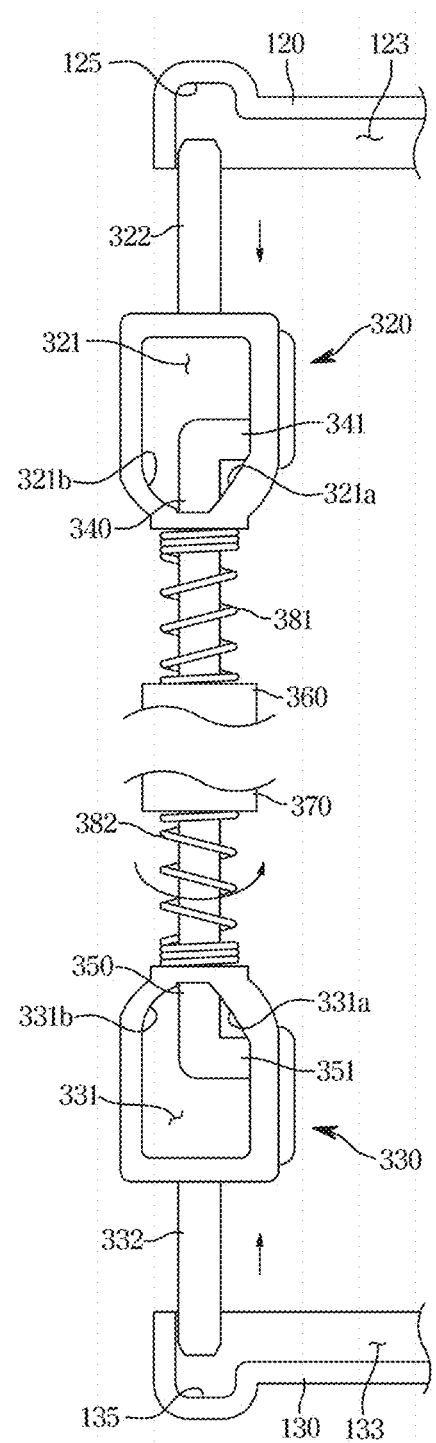

Referring to FIGS. 8A, 11, and 12A, an upper side of the upper operation shaft 340 penetrates a lower portion of the upper lifting member 320 and enters the upper cam groove 321, and a lower side of the upper operation shaft 340 is connected to the upper connection shaft 360 rotatably supported on the frame 220. The upper connection shaft 360 is connected to rotate together with the operation handle 310. Therefore, the upper operation shaft 340 may rotate together when the operation handle 310 rotates.

The upper operation shaft 340 includes an upper protrusion 341 whose upper end is bent to extend in a radial direction within the upper cam groove 321. Therefore, when the upper operation shaft 340 rotates by the operation of the operation handle 310, the upper protrusion 341 rotates while coming into contact with an inner surface of the upper cam groove 321, thereby lifting the upper lifting member 320.

A lower side of the lower operation shaft 350 penetrates an upper portion of the lower lifting member 330 and enters the lower cam groove 331, and an upper side of the lower operation shaft 350 is connected to the lower connection shaft 370 rotatably supported on the frame 220. The lower connection shaft 370 is connected to rotate together with the operation handle 310. Therefore, the lower operation shaft 350 may rotate together when the operation handle 310 rotates.

The lower operation shaft 350 includes a lower protrusion 351 whose upper end is bent to extend in a radial direction within the lower cam groove 331. Therefore, when the lower operation shaft 350 rotates by the operation of the operation handle 310, the lower protrusion 351 rotates while coming into contact with an inner surface of the lower cam groove 331, thereby lifting the lower lifting member 330.

Referring to FIG. 5, the upper connection shaft 360 and an upper side of the operation handle 310 may be rotatably supported on the frame 220 by mounting the upper connection pin 383 at a rotation center thereof. The lower connection shaft 370 and a lower side of the operation handle 310 may also be rotatably supported on the frame 220 by mounting the lower connection pin 384 at a rotation center thereof. The restoration spring 390 may be installed on the lower connection shaft 370 when the lower connection pin 384 is mounted.

Referring to FIGS. 8A and 12A, the upper spring 381 may be a compression coil spring pressing the upper lifting member 320 upward in a state of being installed on an outer surface of the upper operation shaft 340. The upper spring 381 may be provided such that a lower end thereof is supported on the upper connection shaft 360 and an upper end thereof is supported on the upper lifting member 320, in a state of being fitted to the upper operation shaft 340. Therefore, the upper spring 381 may move the upper lifting member 320 upward when the operation handle 310 is not operated.

The lower spring 382 may be a compression coil spring pressing the lower lifting member 330 downward in a state of being installed on an outer surface of the lower operation shaft 350. The lower spring 382 may be provided such that an upper end thereof is supported on the lower connection shaft 370 and a lower end thereof is supported on the lower lifting member 330, in a state of being fitted to the lower operation shaft 350. Therefore, the lower spring 382 may move the lower lifting member 330 downward when the operation handle 310 is not operated.

Referring to FIGS. 8A, 8B, 9A, 9B, and 12A, when the locking device 300 rotates the operation handle 310 in an open direction as shown in FIG. 8B from the state of FIG. 8A, the upper lifting member 320 and the lower lifting member 330 are pulled to an inner side (to the operation handle side) of the frame 220 by the action of the upper operation shaft 340 and the upper cam groove 321 and the action of the lower operation shaft 350 and the lower cam groove 331. Therefore, the locking of the upper locking pin 322 and the lower locking pin 332 may be released from the state of FIG. 9A to the state of FIG. 9B.

The upper locking pin 322 and the lower locking pin 332 of the locking device 300 are coupled to the rear upper guide groove 123 of the upper rail 120 and the rear lower guide groove 133 of the lower rail 130, respectively, as illustrated in FIGS. 6, 10A, and 10B. Therefore, the operation glass 200 may slide without being deviated from the upper rail 120 and the lower rail 130 because the upper locking pin 322 and the lower locking pin 332 move along the upper guide groove 123 and the lower guide groove 133.

Referring to FIGS. 10A and 10B, the rear upper guide groove 123 of the upper rail 120 and the rear lower guide groove 133 of the lower rail 130 include curved guide portions 126 and 136 for inducing the upper locking pin 322 and the lower locking pin 332 to the outdoor side, respectively, so that an outer surface of the operation glass 200 may form the same plane as an outer surface of the fixed glass 100 when the operation glass 200 is completely closed. The rear upper guide groove 123 and the rear lower guide groove 133 also include locking grooves 125 and 135 formed deeper upward or downward, respectively, so that the upper locking pin 322 and the lower locking pin 332 protruding from the frame 220 may be caught thereon in the state in which the operation glass 200 is completely closed.

When the operation glass 200 is closed in the closing direction in the state of FIG. 10A, the upper locking pin 322 and the lower locking pin 332 move toward the locking grooves 125 and 135 along the curved guide portions 126 and 136 and then protrude outside the frame 220 by the elasticity of the upper spring 381 and the lower spring 382 as illustrated in FIG. 10B to enter and be caught on the locking grooves 125 and 135. Therefore, when the operation glass 200 is completely closed, the outer surface of the operation glass 200 and the outer surface of the fixed glass 100 may maintain the same plane. In this state, the operation glass 200 is not opened as long as the operation handle 310 is not operated.

As illustrated in FIG. 6, the front lower guide groove 132 of the lower rail 130 may include a curved guide portion 132a inducing the front lower locking pin 222 to the outdoor side so that the outer surface of the operation glass 200 may form the same plane as the outer surface of the fixed glass 100 when the operation glass 200 is completely closed. Although not shown in the figure, the front upper guide groove of the upper rail 120 is the same as the front lower guide groove 132 of the lower rail 130.

Figure 13:
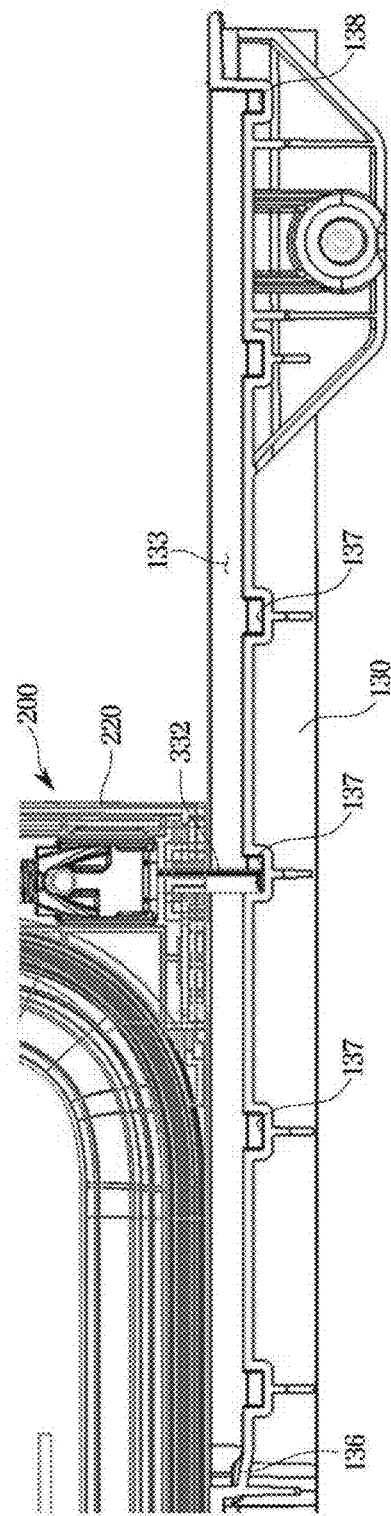
FIGS. 13, 14A, and 14B illustrate a plurality of intermediate locking grooves provided in the lower guide groove of the flush glass apparatus according to an embodiment of the disclosure.

As illustrated in FIG. 13, the rear lower guide groove 133 includes a plurality of intermediate locking grooves 137 and a rear locking groove 138.

The plurality of intermediate locking grooves 137 is formed deeper downward than the lower guide groove 133 at positions spaced apart from each other in a moving direction of the lower locking pin 332 so that the lower locking pin 332 may protrude and be caught thereon in the opening process of the operation glass 200. The rear locking groove 138 is formed deeper rearward than the lower guide groove 133 so that the lower locking pin 332 may protrude and be caught thereon in a state in which the operation glass 200 is completely opened.

Figure 14A:
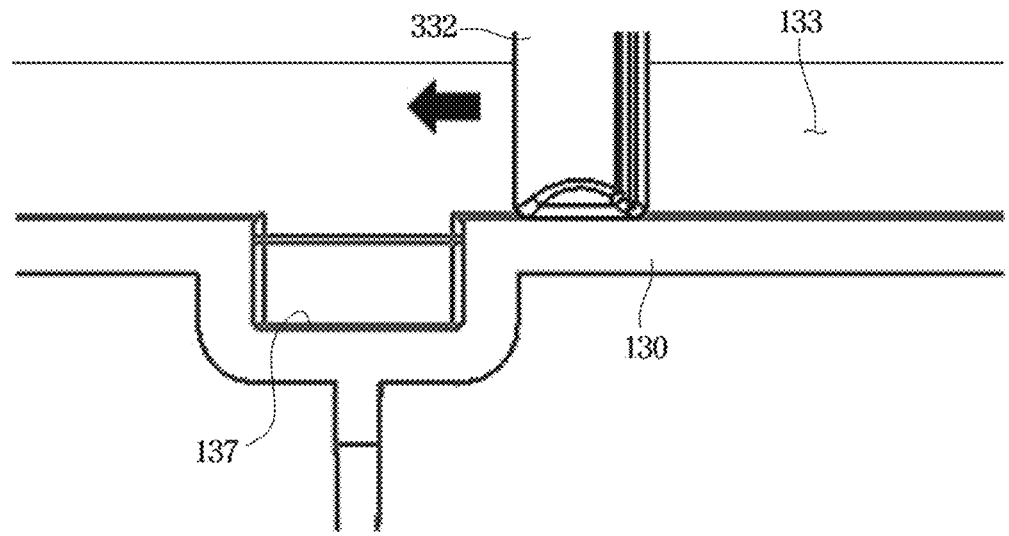
Figure 14B:
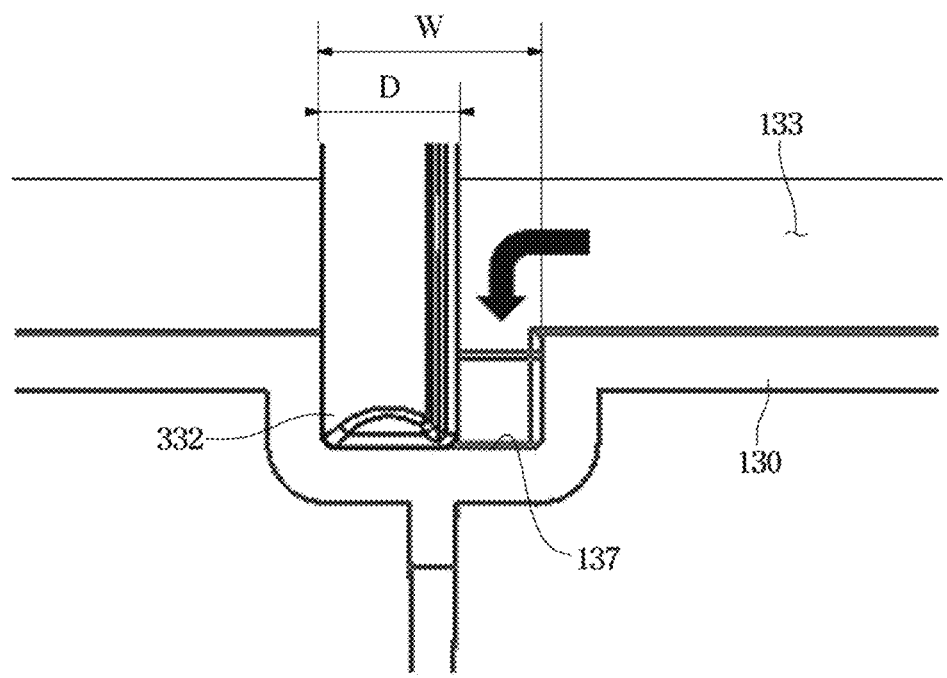

Referring to FIGS. 14A and 14B, the plurality of intermediate locking grooves 137 may have a width W larger than a diameter d of the lower locking pin 332. Therefore, when the operation of the operation handle 310 is released while the operation glass 200 slides in the opening or closing direction, the lower locking pin 332 protruding downward may be stopped by being caught on any one of the intermediate locking grooves 137. The lower locking pin 332 may move as in FIG. 14A, and then enter and be caught on the intermediate locking groove 137 as in FIG. 14B. Because the width W of the intermediate locking groove 137 is larger than the diameter d of the lower locking pin 332, the lower locking pin 332 may smoothly enter the intermediate locking groove 137.

Referring to FIGS. 11, 12A, 12B, and 12C, the upper cam groove 321 and the lower cam groove 331 include first inclined cam surfaces 321a and 331a coming into contact with the upper protrusion 341 or the lower protrusion 351 when the operation handle 310 is rotated in the opening direction, and second inclined cam surfaces 321b and 331b coming into contact with the upper protrusion 341 or the lower protrusion 351 when the operation handle 310 is rotated in the closing direction, respectively.

The first inclined cam surfaces 321a and 331a have lengths and vertical heights h1 longer than those of the second inclined cam surfaces 321b and 331b. Therefore, the first inclined cam surfaces 321a and 331a, when coming into contact with the upper protrusion 341 or the lower protrusion 351 that rotates in the opening direction, may move the upper lifting member 320 and the lower lifting member 330 to the inner side of the frame 220 by a first distance h1, respectively. Also, the second inclined cam surfaces 321b and 331b, when coming into contact with the upper protrusion 341 or the lower protrusion 351 that rotates in the closing direction, may move the upper lifting member 320 and the lower lifting member 330 to the inner side of the frame 220 by a second distance h2 shorter than the first distance h1, respectively.

Figure 12B:
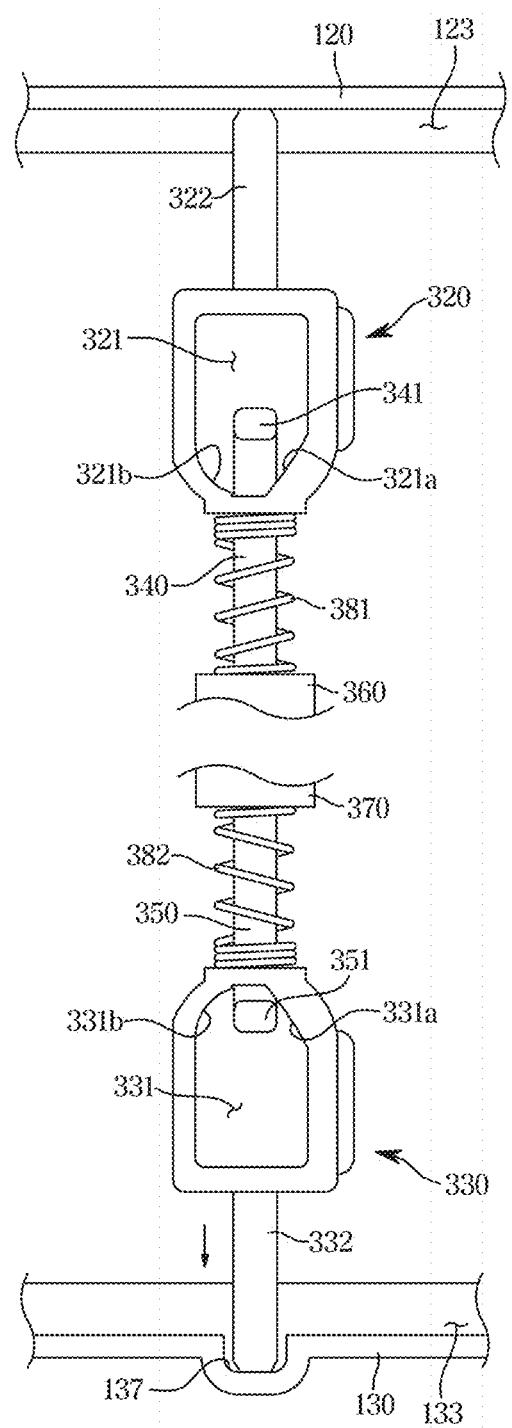
Figure 12C:
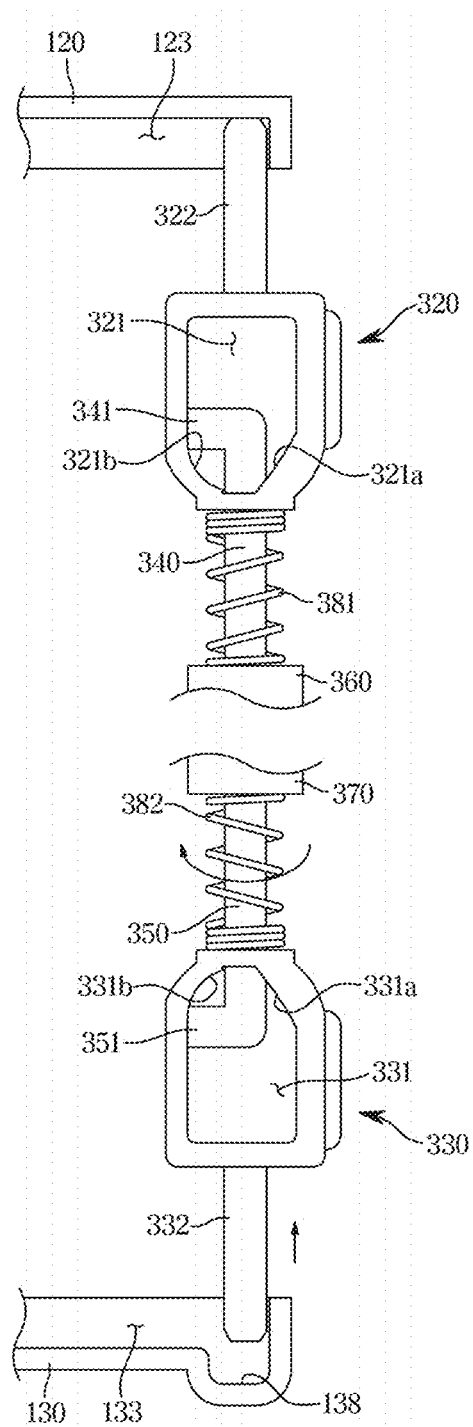

FIG. 12A illustrates a state in which the operation handle 310 is rotated in the opening direction in order to open the operation glass 200 in a state in which the operation glass 200 is completely closed, FIG. 12B illustrates a state in which the lower locking pin 332 is caught on the intermediate locking groove 137 by releasing the operation of the operation handle 310 in the process of moving the operation glass 200 in the opening or closing direction, and FIG. 12C illustrates a state in which the operation handle 310 is rotated in the closing direction in a state in which the operation glass 200 is completely opened.

As in FIG. 12A, when the operation handle 310 is rotated in the opening direction in a state in which the operation glass 200 is completely closed, the upper protrusion 341 and the lower protrusion 351 rotate in the opening direction to come into contact with the first inclined cam surfaces 321a and 331a of the upper cam groove 321 and the lower cam groove 331. At this time, the rotating upper protrusion 341 and lower protrusion 351 press the first inclined cam surfaces 321a and 331a having relatively high heights, so that the upper lifting member 320 and the lower lifting member 330 move to the inner side of the frame 220 by the relatively long first distance h1. Therefore, the upper locking pin 322 and the lower locking pin 332 are deviated from the locking grooves 125 and 135, so that opening of the operation glass 200 is possible. An upper end of the upper locking pin 322 descends to a lower position than an upper surface of the upper guide groove 123, and a lower end of the lower locking pin 332 ascends to a higher position than a lower surface of the lower guide groove 133.

When the operation handle 310 is pulled in the opening direction in the state of FIG. 12A, the operation glass 200 is opened by sliding. When the operation of the operation handle 310 is released in the opening process, the operation handle 310 may be restored to its original state by a restoring force of the restoration spring 390. As in FIG. 12B, when the operation of the operation handle 310 is released in the opening process, the lower locking pin 332 descends to be caught on the intermediate locking groove 137, so that stepwise opening or stepwise closing of the operation glass 200 is possible.

In the state of FIG. 12B, the upper protrusion 341 and the lower protrusion 351 are restored to their original state together with the operation handle 310, but the upper end of the upper locking pin 322 is caught on the upper surface of the upper guide groove 123, thereby limiting the ascending of the upper lifting member 320. Accordingly, the upper protrusion 341 is maintained in a state of being spaced apart from the inner surface of the upper cam groove 321. This is because a height of the upper guide groove 123 is set lower than the maximum ascending height of the upper end of the upper locking pin 322.

Of course, in the state of FIG. 12B, because the lower locking pin 332 descends to enter the intermediate locking groove 137, the lower protrusion 351 is maintained in a state of being caught on a boundary between the first inclined cam surface 133a and the second inclined cam surface 133b. Also, when an external force on the operation handle 310 is released in a state in which the operation glass 200 is completely opened, as in FIG. 12B, the lower locking pin 332 enters and is caught on the locking groove 138, and the upper end of the upper locking pin 322 is caught on the upper surface of the upper guide groove 123, so that the upper locking pin 322 is maintained in a state in which the ascending thereof is limited.

As in FIG. 12C, when the operation handle 310 is rotated in the closing direction in a state in which the operation glass 200 is completely opened, the upper protrusion 341 and the lower protrusion 351 rotate in the closing direction to come into contact with the second inclined cam surfaces 321b and 331b of the upper cam groove 321 and the lower cam groove 331. At this time, the rotating lower protrusion 351 presses the second inclined cam surfaces 321b and 331b having relatively low heights, so that the lower lifting member 330 ascends to the inner side of the frame 220 by the relatively short second distance h2. Accordingly, the lower locking pin 332 is deviated from the locking groove 135, and the operation glass 200 may move in the closing direction. At this time, because the upper end of the upper locking pin 322 is caught on the upper surface of the upper guide groove 123 so that the upper locking pin 322 is in a state in which the ascending thereof is limited, the upper protrusion 341 freely rotates in a state of being spaced apart from the inner surface of the upper cam groove 321.

When the operation glass 200 in the state of FIG. 12C is pushed to the fully closed position and closed, the upper locking pin 322 is first caught by entering the locking groove 125 of the upper guide groove 123 by the extension of the upper spring 381. The upper locking pin 322 moves to the final closing position in a state in which the upper end thereof is caught on the upper surface of the upper guide groove 123 and the ascending thereof is limited, so that the upper locking pin 322 first ascends regardless of the operation of the operation handle 310 to be caught on the locking groove 125. At this time, a slight hitting sound is generated as the upper locking pin 322 enters the locking groove 125, so that the user may easily recognize whether the operation glass 200 is completely closed.

When the operation handle 310 is released in a state in which the operation glass 200 is completely closed, the upper locking pin 322 and the lower locking pin 332 are maintained in a state of being caught on the locking grooves 125 and 135, respectively, as in FIG. 10B, and the operation handle 310 is restored to its original state by the restoring force of the restoration spring 390.

As such, the flush glass apparatus according to the present embodiment may move the operation glass 200 in a desired direction simply by an operation to rotate the operation handle 310 of the locking device 300 in the opening or closing direction, so that the operation glass 200 may be easily opened and closed.

Further, the flush glass apparatus according to the present embodiment may provide a beautiful appearance because the operation handle 310 may be restored to its original state from the opened state, the closed state, and a half opened state of the operation glass 200.

Further, in the flush glass apparatus according to the present embodiment, the upper locking pin 322 first ascends regardless of the operation of the operation handle 310 to be caught on the locking groove 125 when the operation glass 200 is closed, and a slight hitting sound is generated as the upper locking pin 322 enters the locking groove 125, so that the user may easily recognize whether the operation glass 200 is completely closed.

As is apparent from the above, a flush glass apparatus according to an embodiment of the disclosure can move an operation glass in a desired direction simply by an operation to rotate an operation handle in an opening or closing direction, so that the operation glass can be easily opened and closed.

Further, the flush glass apparatus according to an embodiment of the disclosure can provide a beautiful appearance because the operation handle is restored to its original state from an opened state, a closed state, and a half opened state of the operation glass.

Further, in the flush glass apparatus according to an embodiment of the disclosure, an upper locking pin first ascends regardless of the operation of the operation handle to be caught on a locking groove when the operation glass is closed, and a slight hitting sound is generated as the upper locking pin enters the locking groove, so that a user can easily recognize whether the operation glass is completely closed.

What is claimed is:

1. A flush glass apparatus comprising:
an operation glass comprising a glass portion and a frame and configured to open and close an opening of a fixed glass by sliding in a lateral direction; and
a locking device configured to lock and unlock the operation glass, wherein the locking device comprises:
an operation handle installed on the frame to be rotated left and right and configured to be restored to its original state by a restoration spring;
an upper lifting member installed on an upper side of the frame and comprising an upper cam groove and an upper locking pin protruding above the frame;
an upper operation shaft having a lower side connected to the operation handle and an upper side entering the upper cam groove and comprising an upper protrusion extending radially in the upper cam groove;
an upper spring configured to move the upper lifting member by pressing upward;
a lower lifting member installed on a lower side of the frame and comprising a lower cam groove and a lower locking pin protruding to the lower side of the frame;
a lower operation shaft having an upper side connected to the operation handle and a lower side entering the lower cam groove and comprising a lower protrusion extending radially in the lower cam groove; and
a lower spring configured to move the lower lifting member by pressing downward.

2. The flush glass apparatus according to claim 1, wherein:
the upper operation shaft is connected to the operation handle by an upper connection shaft having an upper side penetrating a lower portion of the upper lifting member to enter the upper cam groove and a lower side rotatably supported on the frame; and
the lower operation shaft is connected to the operation handle by a lower connection shaft having a lower side penetrating an upper portion of the lower lifting member to enter the lower cam groove and an upper side rotatably supported on the frame.

3. The flush glass apparatus according to claim 1, wherein the upper cam groove and the lower cam groove each comprise:
a first inclined cam surface configured to come into contact with the upper protrusion or the lower protrusion when the operation handle is rotated in an opening direction and to move the upper lifting member or the lower lifting member to an inner side of the frame by a first distance; and
a second inclined cam surface configured to come into contact with the upper protrusion or the lower protrusion when the operation handle is rotated in a closing direction and to move the upper lifting member or the lower lifting member to an inner side of the frame by a second distance shorter than the first distance.

4. The flush glass apparatus according to claim 3, wherein the first inclined cam surface has a length and a height in a vertical direction longer than the second inclined cam surface.

5. The flush glass apparatus according to claim 1, further comprising:
- an upper rail slidably supporting an upper portion of the frame and having an upper guide groove extending in a lengthwise direction to guide a movement of the upper locking pin; and
- a lower rail slidably supporting a lower portion of the frame and having a lower guide groove extending in a lengthwise direction to guide a movement of the lower locking pin.

6. The flush glass apparatus according to claim 5, wherein the upper guide groove and the lower guide groove each comprise:
- a curved guide portion configured to induce the upper locking pin or the lower locking pin to an outdoor side so that an outer surface of the operation glass forms a same plane as an outer surface of the fixed glass when the operation glass is completely closed; and
- a locking groove formed deeper upward or downward than the upper guide groove or the lower guide groove so that the upper locking pin or the lower locking pin is caught thereon in a state in which the operation glass is completely closed.

7. The flush glass apparatus according to claim 5, wherein the lower guide groove comprises:
- a plurality of intermediate locking grooves formed deeper downward than the lower guide groove at positions spaced apart from each other in a moving direction of the lower locking pin so that the lower locking pin protrudes and is caught thereon in an opening process of the operation glass; and
- a locking groove formed deeper downward than the lower guide groove so that the lower locking pin protrudes and is caught thereon in a state in which the operation glass is completely opened.

8. The flush glass apparatus according to claim 7, wherein a width of the plurality of intermediate locking grooves is formed larger than a diameter of the lower locking pin.

9. A vehicle comprising:
- a vehicle body;
- a fixed glass coupled to the vehicle body;
- an operation glass comprising a glass portion and a frame and configured to open and close an opening of the fixed glass by sliding in a lateral direction;
- an operation handle installed on the frame to be rotated left and right and configured to be restored to its original state by a restoration spring;
- an upper lifting member installed on an upper side of the frame and comprising an upper cam groove and an upper locking pin protruding above the frame;
- an upper operation shaft having a lower side connected to the operation handle and an upper side entering the upper cam groove and comprising an upper protrusion extending radially in the upper cam groove;
- an upper spring configured to move the upper lifting member by pressing upward;
- a lower lifting member installed on a lower side of the frame and comprising a lower cam groove and a lower locking pin protruding to the lower side of the frame;
- a lower operation shaft having an upper side connected to the operation handle and a lower side entering the lower cam groove and comprising a lower protrusion extending radially in the lower cam groove; and
- a lower spring configured to move the lower lifting member by pressing downward.

10. The vehicle according to claim 9, wherein:
- the upper operation shaft is connected to the operation handle by an upper connection shaft having an upper side penetrating a lower portion of the upper lifting member to enter the upper cam groove and a lower side rotatably supported on the frame; and
- the lower operation shaft is connected to the operation handle by a lower connection shaft having a lower side penetrating an upper portion of the lower lifting member to enter the lower cam groove and an upper side rotatably supported on the frame.

11. The vehicle according to claim 9, wherein the upper cam groove and the lower cam groove each comprise:
- a first inclined cam surface configured to come into contact with the upper protrusion or the lower protrusion when the operation handle is rotated in an opening direction and to move the upper lifting member or the lower lifting member to an inner side of the frame by a first distance; and
- a second inclined cam surface configured to come into contact with the upper protrusion or the lower protrusion when the operation handle is rotated in a closing direction and to move the upper lifting member or the lower lifting member to an inner side of the frame by a second distance shorter than the first distance.

12. The vehicle according to claim 11, wherein the first inclined cam surface has a length and a height in a vertical direction longer than the second inclined cam surface.

13. The vehicle according to claim 9, further comprising:
- an upper rail slidably supporting an upper portion of the frame and having an upper guide groove extending in a lengthwise direction to guide a movement of the upper locking pin; and
- a lower rail slidably supporting a lower portion of the frame and having a lower guide groove extending in a lengthwise direction to guide a movement of the lower locking pin.

14. The vehicle according to claim 13, wherein the upper guide groove and the lower guide groove each comprise:
- a curved guide portion configured to induce the upper locking pin or the lower locking pin to an outdoor side so that an outer surface of the operation glass forms a same plane as an outer surface of the fixed glass when the operation glass is completely closed; and
- a locking groove formed deeper upward or downward than the upper guide groove or the lower guide groove so that the upper locking pin or the lower locking pin is caught thereon in a state in which the operation glass is completely closed.

15. The vehicle according to claim 13, wherein the lower guide groove comprises:
- a plurality of intermediate locking grooves formed deeper downward than the lower guide groove at positions spaced apart from each other in a moving direction of the lower locking pin so that the lower locking pin protrudes and is caught thereon in an opening process of the operation glass; and
- a locking groove formed deeper downward than the lower guide groove so that the lower locking pin protrudes and is caught thereon in a state in which the operation glass is completely opened.

16. The vehicle according to claim 15, wherein a width of the plurality of intermediate locking grooves is formed larger than a diameter of the lower locking pin.

17. A locking device configured to lock and unlock an operation glass that comprises a frame, the locking device comprising:

an operation handle to be installed on the frame to be rotated left and right and configured to be restored to its original state by a restoration spring;

an upper lifting member to be installed on an upper side of the frame and comprising an upper cam groove and an upper locking pin protruding above the frame;

an upper operation shaft having a lower side connected to the operation handle and an upper side entering the upper cam groove and comprising an upper protrusion extending radially in the upper cam groove;

an upper spring configured to move the upper lifting member by pressing upward;

a lower lifting member to be installed on a lower side of the frame and comprising a lower cam groove and a lower locking pin protruding to the lower side of the frame;

a lower operation shaft having an upper side connected to the operation handle and a lower side entering the lower cam groove and comprising a lower protrusion extending radially in the lower cam groove; and a lower spring configured to move the lower lifting member by pressing downward.

18. The locking device according to claim 17, wherein:

the upper operation shaft is connected to the operation handle by an upper connection shaft having an upper side penetrating a lower portion of the upper lifting member to enter the upper cam groove and a lower side rotatably supported on the frame; and the lower operation shaft is connected to the operation handle by a lower connection shaft having a lower side penetrating an upper portion of the lower lifting member to enter the lower cam groove and an upper side rotatably supported on the frame.

19. The locking device according to claim 17, wherein the upper cam groove and the lower cam groove each comprise:

a first inclined cam surface configured to come into contact with the upper protrusion or the lower protrusion when the operation handle is rotated in an opening direction and to move the upper lifting member or the lower lifting member to an inner side of the frame by a first distance; and a second inclined cam surface configured to come into contact with the upper protrusion or the lower protrusion when the operation handle is rotated in a closing direction and to move the upper lifting member or the lower lifting member to an inner side of the frame by a second distance shorter than the first distance.

* * * * *